United States Patent
Chen et al.

(10) Patent No.: US 7,595,963 B1
(45) Date of Patent: Sep. 29, 2009

(54) HEAD GIMBAL ASSEMBLY INCLUDING A FLEXURE WITH A FIRST CONDUCTIVE TRACE DISPOSED BETWEEN A SLIDER AND A DIELECTRIC LAYER

(75) Inventors: Yih-Jen Chen, Fremont, CA (US); Drew B. Larson, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 553 days.

(21) Appl. No.: 11/449,261

(22) Filed: Jun. 7, 2006

(51) Int. Cl.
*G11B 5/48* (2006.01)
(52) U.S. Cl. .................................. 360/245.9
(58) Field of Classification Search ........................ None
See application file for complete search history.

(56) References Cited

U.S. PATENT DOCUMENTS

| | | | |
|---|---|---|---|
| 4,030,189 A | 6/1977 | Lazzari | |
| 5,587,857 A | 12/1996 | Voldman et al. | |
| 5,598,307 A * | 1/1997 | Bennin | 360/245.9 |
| 5,645,735 A | 7/1997 | Bennin et al. | |
| 5,930,072 A | 7/1999 | Shrinkle | |
| 5,995,328 A * | 11/1999 | Balakrishnan | 360/245.9 |
| 6,036,813 A | 3/2000 | Schulz et al. | |
| 6,160,688 A | 12/2000 | Okumura | |
| 6,163,443 A | 12/2000 | Hatagami et al. | |
| 6,496,190 B1 | 12/2002 | Driemeyer et al. | |
| 6,621,661 B1 | 9/2003 | Ichikawa et al. | |
| 7,064,928 B2 * | 6/2006 | Fu et al. | 360/234.5 |
| 7,099,117 B1 * | 8/2006 | Subrahmanyam et al. | 360/245.9 |
| 2003/0128474 A1 * | 7/2003 | Schulz et al. | 360/245.9 |
| 2004/0022169 A1 | 2/2004 | Itchikawa et al. | |
| 2004/0070880 A1 | 4/2004 | Fu et al. | |
| 2005/0117257 A1 * | 6/2005 | Thaveeprungsriporn et al. | 360/246 |
| 2005/0280940 A1 | 12/2005 | Kamigama | |

* cited by examiner

*Primary Examiner*—Mark Blouin
(74) *Attorney, Agent, or Firm*—Barcelo & Harrison, LLP (57) ABSTRACT

There is provided a head gimbal assembly (HGA) for a disk drive. The HGA includes a slider and a flexure. The slider includes first, second and third electrically conductive pads disposed upon a trailing side. The first electrically conductive pad is disposed between the second and third electrically conductive pads. The flexure includes first, second, and third patterned conductive traces respectively electrically connected to the first, second, and third electrically conductive pads. The first patterned conductive trace is disposed between the second and third patterned conductive traces in a flexure body portion.

14 Claims, 6 Drawing Sheets

HEAD GIMBAL ASSEMBLY INCLUDING A FLEXURE WITH A FIRST CONDUCTIVE TRACE DISPOSED BETWEEN A SLIDER AND A DIELECTRIC LAYER

FIELD OF THE INVENTION

The present invention relates generally to disk drives, and in particular a head gimbal assembly including a flexure with a first conductive trace disposed between a slider and a dielectric layer.

BACKGROUND

The typical hard disk drive includes a head disk assembly (HDA) and a printed circuit board assembly (PCBA) attached to a disk drive base of the HDA. The HDA includes at least one disk, a spindle motor for rotating the disk, and a head stack assembly (HSA). The PCBA includes a disk controller for generating servo control signals. The HSA includes a head for reading and writing data from and to the disk. The HSA is controllably positioned in response to the generated servo control signals from the disk controller to move the head relative to tracks of the disk.

The HSA includes an actuator assembly, at least one head gimbal assembly (HGA), and a flex cable assembly. The actuator assembly typically includes an actuator having an actuator body with one or more actuator arms extending from the actuator body. Each actuator arm supports the HGA that includes a head. An actuator coil is supported by the actuator body. The actuator coil interacts with a magnet to form a voice coil motor. The PCBA controls current passing through the actuator coil that results in a torque being applied to the actuator. The HSA further includes the flex cable assembly in electrical communication with the PCBA. The flex cable assembly supplies current to the coil and carries signals between the head and the PCBA.

A flexure extends along the load beam and is considered a sub-component of the HGA. The head is attached and electrically connected to the flexure. The flexure includes a flexure tail portion that extends away from the head. The flexure tail portion is disposed adjacent the actuator body and attaches with the flex cable assembly. The flexure includes conductive traces that extend from adjacent the head and terminate at electrical connection points at the flexure tail portion. The flex cable assembly includes a flex cable with electrical conduits that correspond to the electrical connection points of the flexure.

The head includes a slider and a transducer disposed on the slider. Several conductive pads are distributed along a trailing side of the slider. The conductive pads are electrically connected to electrical components of the transducer that are disposed on a trailing surface of the slider. Such electrical components may include poles of a writer, shields of a read element, and electrical ground, for examples. The electrical pads are electrically bonded with the conductive traces of the flexure. Standard assignment or ordering of the conductive pads is common. The state of the art flexure design includes not only a gimbal structure that provides compliance necessary for flying the slider, but also includes many conductive traces extending to the flexure tail portion for electrical connection with a preamplifier chip or "pre-amp."

In many contemporary disk drives, the head includes some electrical connection to ground. Different approaches have been taken to provide such grounding. In one approach, the head is electrically grounded to the flexure, for example, using a conductive epoxy in contact with both the slider body and the flexure, or through a conductive via leading from a transducer terminal to the metal backing layer of the flexure.

In another approach, the head is grounded through a conductive trace leading to a pre-amp. This approach to grounding entails additional complexity and constraints because the pre-amp may be disposed at the flex cable to flexure tail interface at the actuator body, and so the grounding path is constrained by the routing patterns of other needed conductive traces on the flexure. Because the conductive traces are typically disposed in a common plane and cannot cross one another without electrically shorting, there are inherent limitations as to the trace routing patterns. A standard conductive trace routing configuration includes the conductive traces that are to be connected to the innermost pair of the conductive pads being assigned to the outermost traces that extend along the flexure to the pre-amp. As such, ordering of the electrical traces at the conductive pads constrains the ordering of such traces at the pre-amp. Moreover, with smaller form factor disk drives, there is limited area at the flex tail portion and flex cable interface for trace rerouting or re-ordering at such location.

It would be desirable to have more freedom with regard to the pin-out configuration of the flex cable and/or a pre-amp that electrically connects to the flexure tail portion of the flexure, rather than have the pin-out configuration dictated by the standard ordering of the pads on the slider and/or routing limitations of the conductive traces of the flexure. As such, there is a need in the art for an improved flexure configuration to enhance freedom of electrical connectivity between the head and the pre-amp.

SUMMARY

According to an aspect of the present invention, there is provided a head gimbal assembly (HGA) for a disk drive. The HGA includes a slider, a load beam, a flexure and a base plate. The slider includes a top surface and an air bearing surface that opposes the top surface, a leading side, and a trailing side that opposes the leading side. The slider further includes first, second and third electrically conductive pads disposed upon the trailing side. The first electrically conductive pad is disposed between the second and third electrically conductive pads. The flexure includes a flexure body portion affixed to the load beam, a tongue portion with the slider being attached to the tongue portion, first and second gimbal arms extending between the flexure body and the tongue portion, a metal backing layer and a dielectric layer. The flexure further includes first, second, and third patterned conductive traces respectively electrically connected to the first, second, and third electrically conductive pads and disposed upon the dielectric layer. The first patterned conductive trace is disposed upon the dielectric layer between the top surface of the slider and the dielectric layer. The second patterned conductive trace is disposed in the tongue portion and extends along the first gimbal arm to the flexure body. The third patterned conductive trace is disposed in the tongue portion and extends along the second gimbal arm to the flexure body. The first patterned conductive trace is disposed between the second and third patterned conductive traces along the flexure body. The base plate, for mounting the HGA, is attached to the load beam.

DESCRIPTION OF THE PREFERRED EMBODIMENTS

Figure 1:
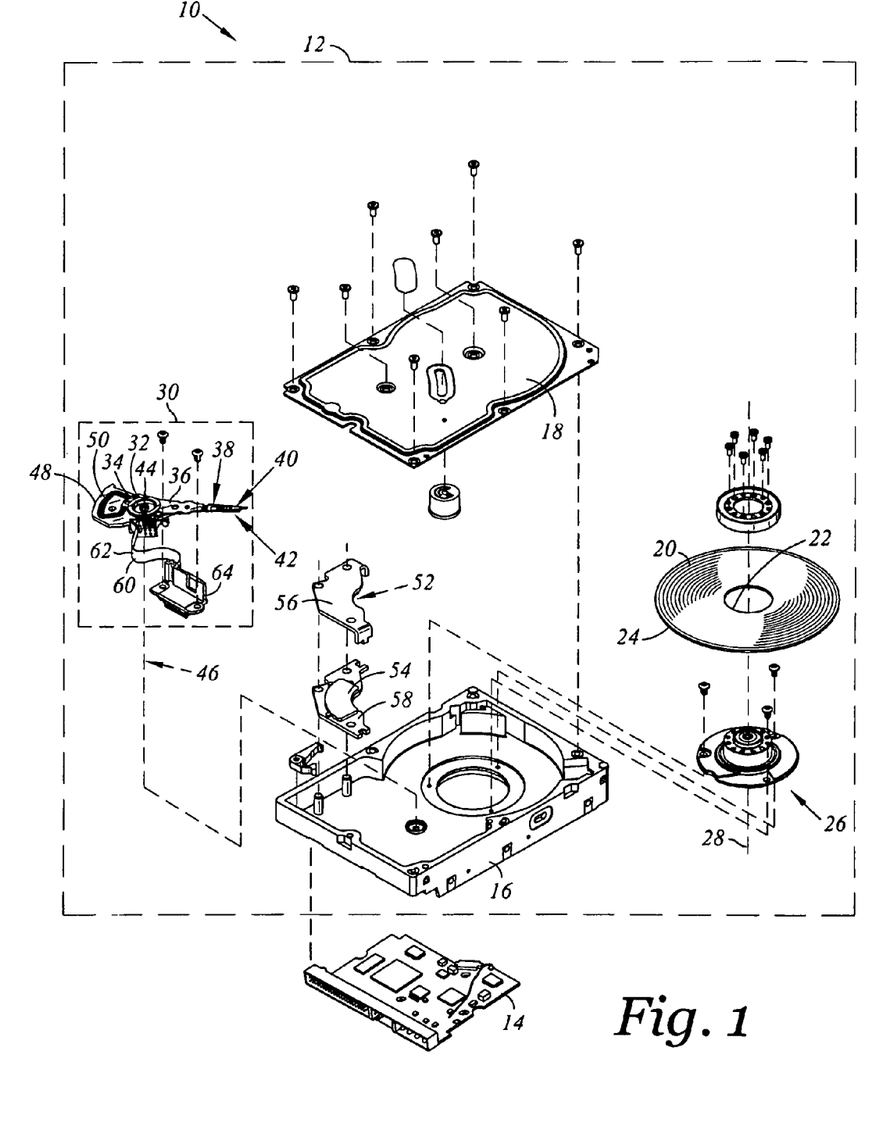
FIG. 1 is an exploded top perspective view of a disk drive including a head gimbal assembly according to an embodiment of the present invention.

Referring now to FIG. 1, there is depicted an exploded perspective view of a disk drive 10 capable of incorporating an embodiment of the present invention (details of which are discussed below and shown in additional figures). The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. A single disk 20 or additional disks may be utilized. The disk 20 includes an inner diameter (ID) 22 and an outer diameter (OD) 24. The disk 20 further includes a plurality of tracks for storing data. The disk 20 may be of a magnetic recording type of storage device, however, other arrangements such as optical recording may be utilized. The head disk assembly 12 further includes a spindle motor 26 for rotating the disk 20 about a disk rotation axis 28. The head disk assembly 12 further includes a head stack assembly (HSA) 30 rotatably attached to the disk drive base 16 in operable communication with the disk 20. The head stack assembly 30 includes an actuator 32.

The actuator 32 includes an actuator body 34 and an actuator arm 36 that extends from the actuator body 34. Distally attached to the actuator arm 36 is a suspension assembly 38. The suspension assembly 38 supports a head 40. The suspension assembly 38 with the head 40 is referred to as a head gimbal assembly (HGA) 42. It is contemplated that the number of actuator arms and suspension assemblies may vary depending upon the number of disks and disk surfaces utilized.

The head 40 typically includes a transducer for writing and reading data. The head 40 may be referred to as a read head. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head 40 may also include an objective lens and an active or passive mechanism for controlling the separation of the objective lens from a disk surface of the disk 20. The disk 20 includes opposing disk surfaces. In magnetic recording applications the disk surface typically includes one or more magnetic layers. Data may be recorded along data annular regions on a single disk surface or both.

The head stack assembly 30 may be pivoted such that the head 40 is disposed adjacent to the various data annular regions from adjacent to the outer diameter 24 to the inner diameter 22 of the disk 20. Shown is a conventional "rotary" or "swing-type" actuator assembly. In this embodiment the actuator body 34 includes a bore, and the actuator 32 further includes a pivot bearing cartridge 44 engaged within the bore for facilitating the actuator body 34 to rotate between limited positions about an axis of rotation 46.

The actuator 32 further includes a coil support element 48 that extends from one side of the actuator body 34 opposite the actuator arms 36. The coil support element 48 is configured to support a coil 50. First and second magnets 52, 54 are supported by first and second magnet supports 56, 58 which are attached to the disk drive base 16 (the first magnet 52 is denoted in dashed lining and it is understood that it is disposed at an underside of the first magnet support 56). The coil 50 interacts with the first and second magnets 52, 54 to form a voice coil motor for controllably rotating the actuator 32. The printed circuit board assembly 14 includes a servo control system in the form of a disk controller for generating servo control signals. These servo control signals take the form of current passing through the coil 50 that results in a torque being applied to the actuator 32. The head stack assembly 30 further includes a flex cable assembly 60. The flex cable assembly 60 includes a flex cable 62 and a cable connector 64. The cable connector 64 is attached to the disk drive base 16 and is disposed in electrical communication with the printed circuit board assembly 14. The flex cable assembly 60 supplies current to the coil 46 and carries signals between the head 40 and the printed circuit board assembly 14.

Figure 2:
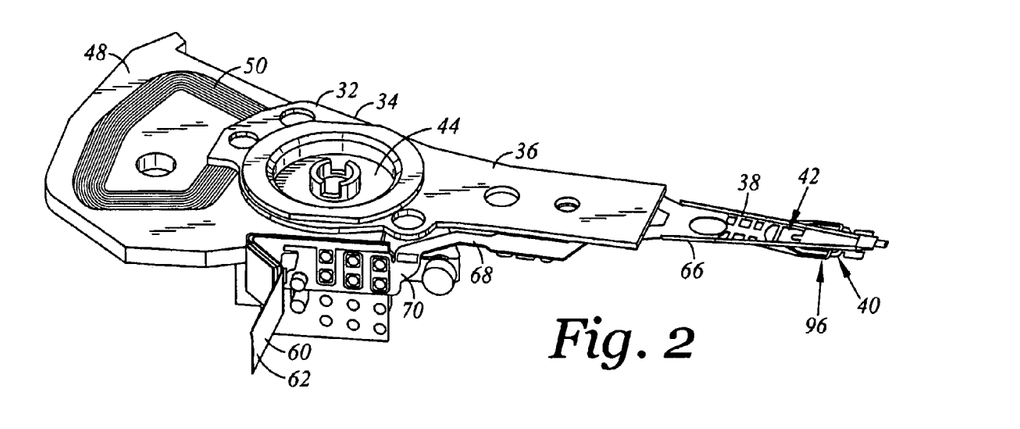
FIG. 2 is an enlarged top perspective view of a head stack assembly of FIG. 1 that includes the head gimbal assembly according to an embodiment.
Figure 3:
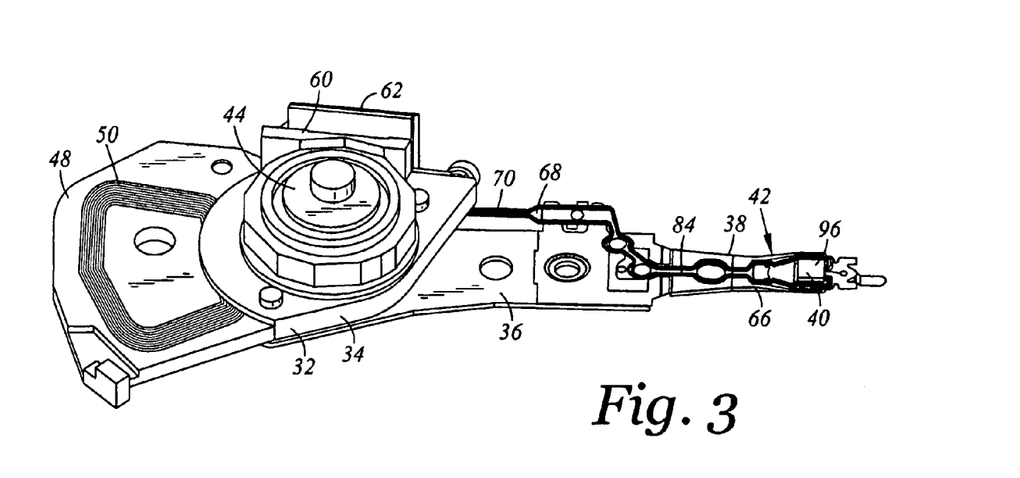
FIG. 3 is an enlarged bottom perspective view of the head stack assembly of FIG. 1.

Referring additionally to FIG. 2, there is depicted an enlarged top perspective view of the head stack assembly 30 of FIG. 1. FIG. 3 is an enlarged bottom perspective view of the head stack assembly 30 of FIG. 1. In the embodiment shown, the suspension assembly 38 includes a load beam 66. The load beam 66 is coupled to the actuator arm 36 with the load beam 66 extending distally from the actuator arm 36. The load beam 66 includes a bend area that makes the load beam 66 compliant in a direction normal to the disk 20 to allow an air bearing to position the head 40 at a desired fly height above a surface of the disk 20. The bend area of the load beam 66 is initially plastically deformed through a macroscopic angle so that when it is elastically straightened during disk drive assembly it can provide a pre-load force upon the head 40 against the disk 20. The pre-load force is commonly referred to as a "gram load" because it is typically measured in grams.

A flexure 68 is electrically connected to the flex cable 62. As shown in FIG. 3, the flexure 68 is overlaid on the actuator arm 36 and the distally extending load beam 66. The flexure 68 may be referred to as a trace assembly or a trace suspension assembly. The flexure 68 extends along the actuator arm 36 and the load beam 66. The head 40 is attached to and electrically connected to the flexure 68. The flexure 68 includes a flexure tail portion 70 that is opposite the attachment end of the head 40. The flexure tail portion 70 is disposed adjacent the actuator body 34.

Figure 4:
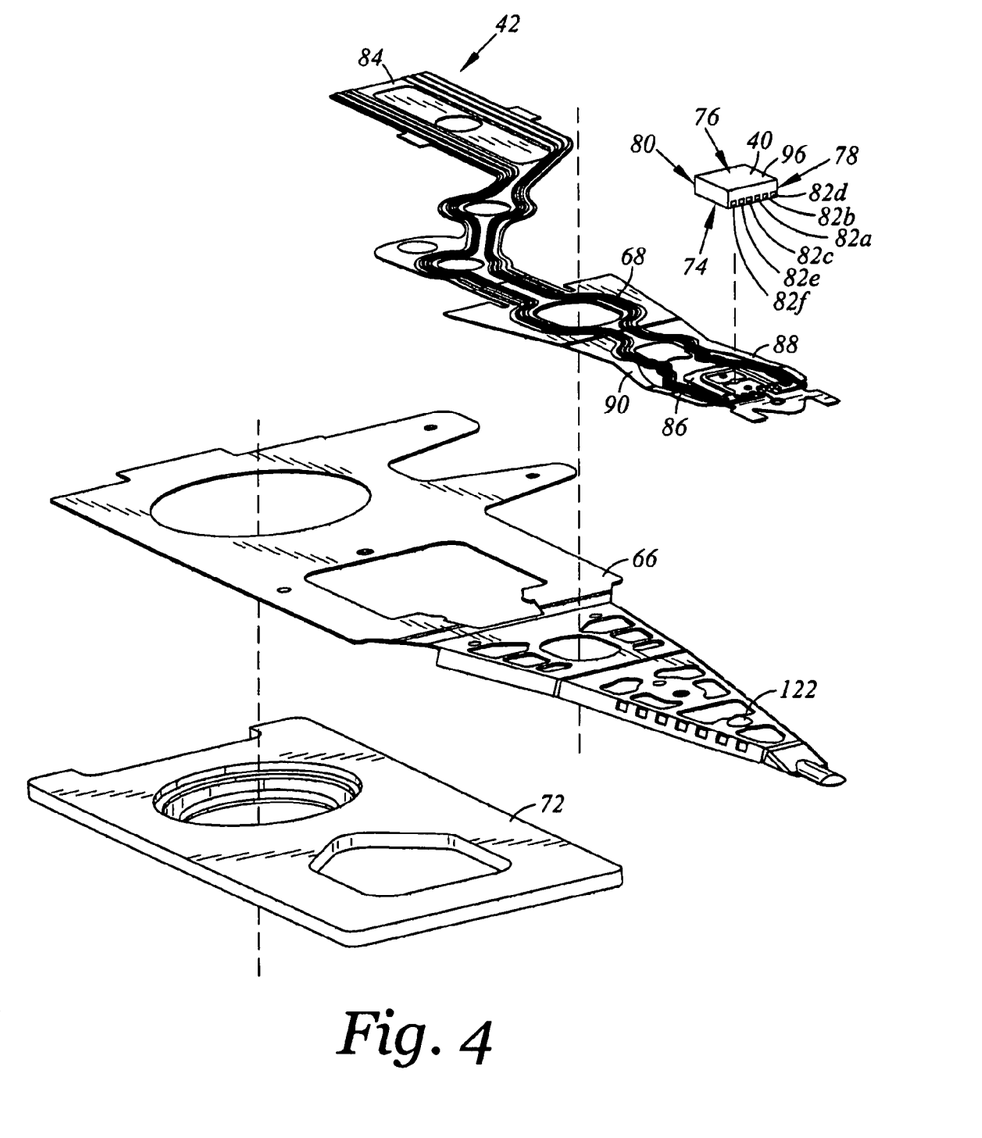
FIG. 4 is an exploded enlarged perspective view of a portion of the head gimbal assembly of FIG. 3.
Figure 5:
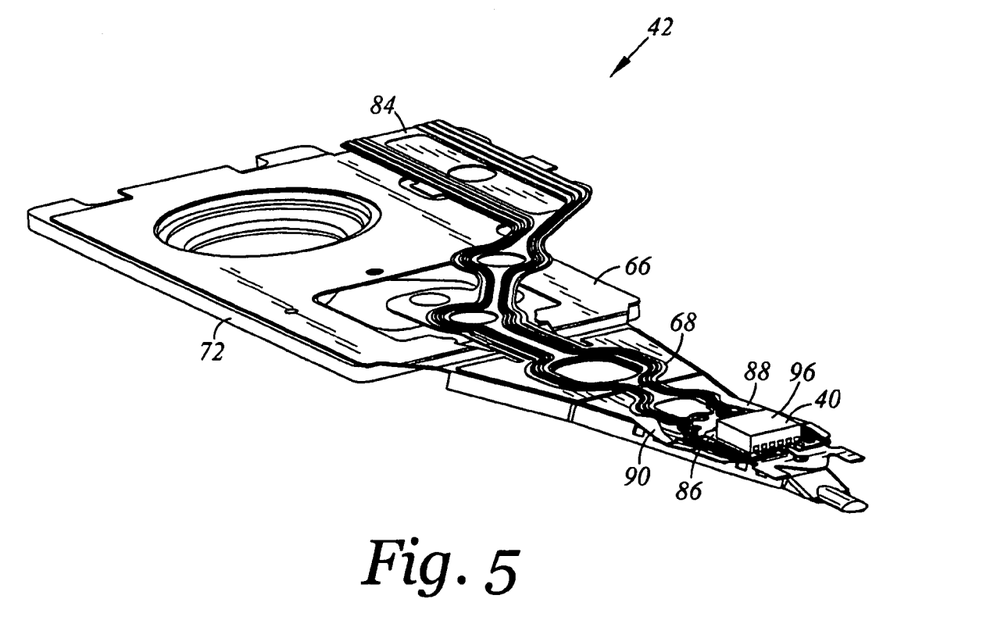
FIG. 5 is the portion of the head gimbal assembly of FIG. 4 as assembled.
Figure 6:
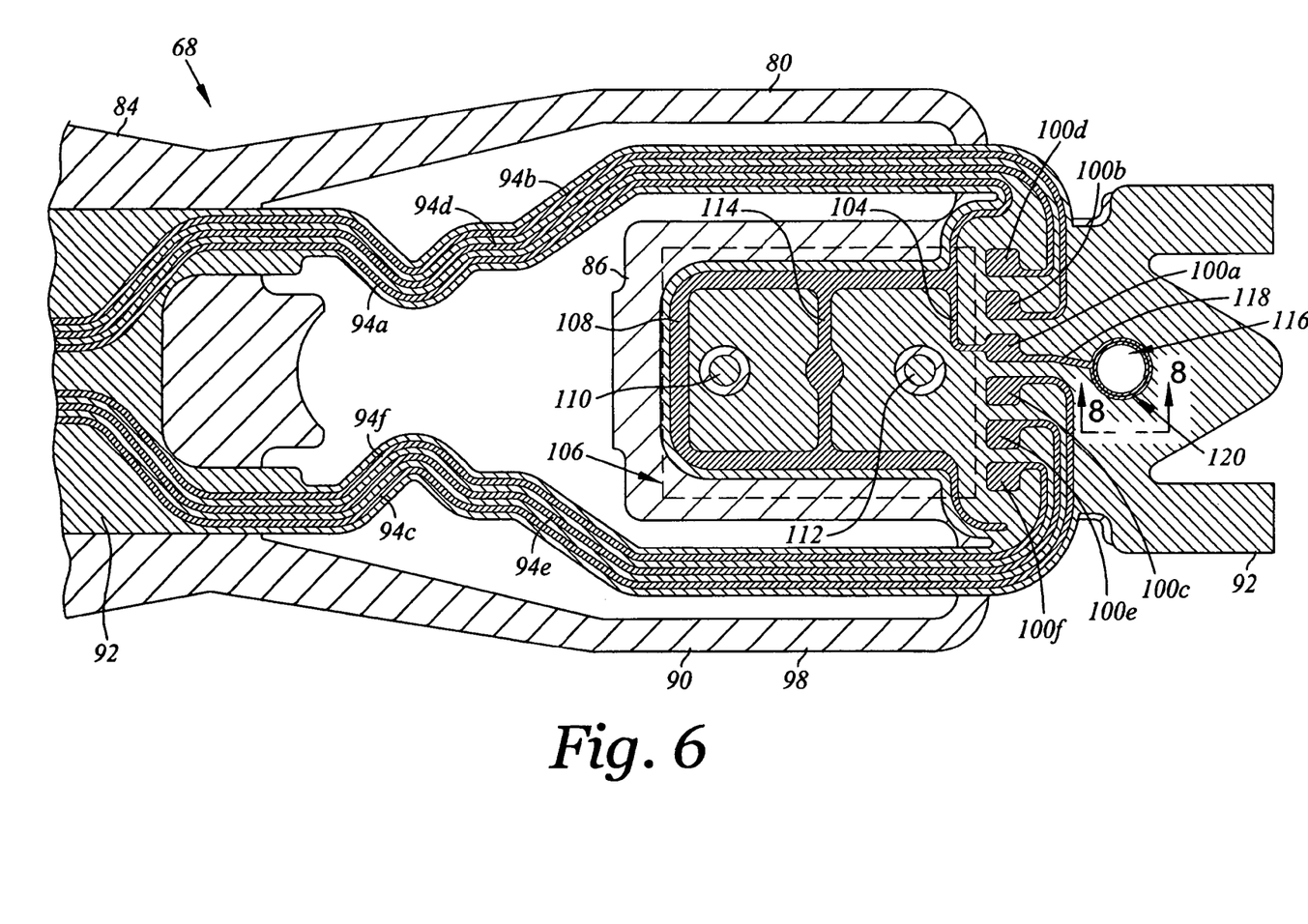
FIG. 6 is an enlarged top plan view of a portion of the head gimbal assembly with a portion of a flexure shown.
Figure 7:
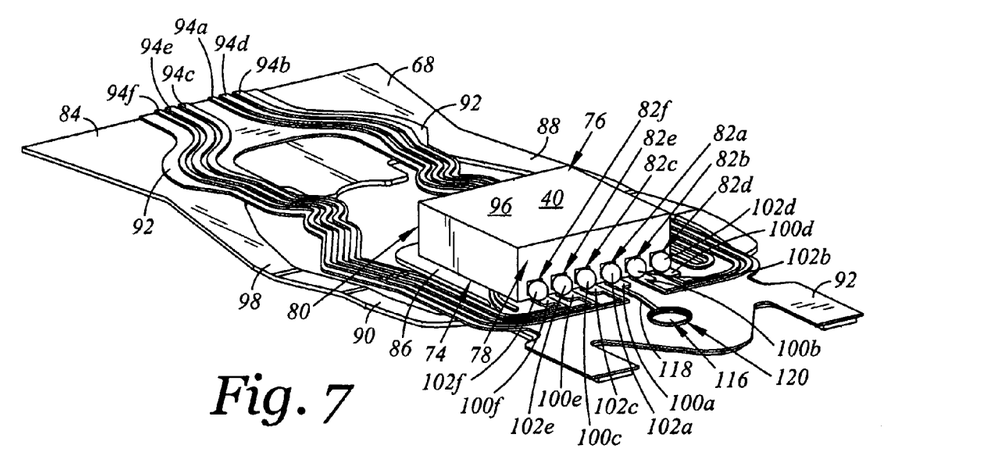
FIG. 7 is a further enlarged perspective view of a portion of the head gimbal assembly of the head stack assembly of FIG. 3.
Figure 8:
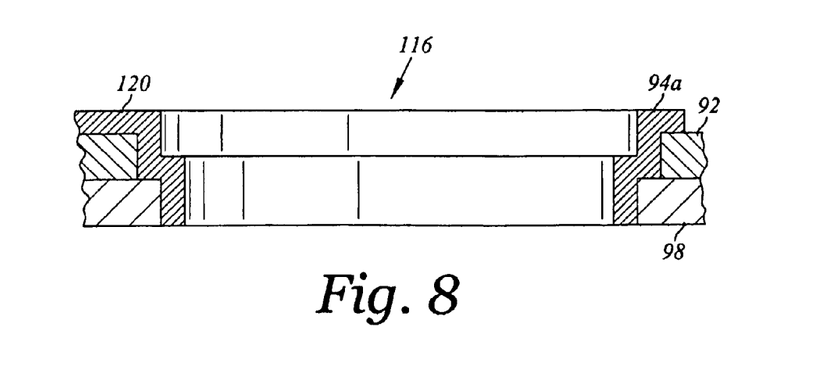
FIG. 8 is a cross-sectional side view of a portion of the flexure as seen along axis 8-8 of FIG. 6.

Referring additionally to FIG. 4, there is depicted an exploded enlarged perspective view of a portion of the head gimbal assembly 42 of FIG. 3. FIG. 5 is the portion of the head gimbal assembly 42 of FIG. 4 as assembled. FIG. 6 is an enlarged top plan view of a portion of the head gimbal assembly 42 with a portion of the flexure 68 shown but without a slider 96. FIG. 7 is a further enlarged perspective view of a portion of the head gimbal assembly 42 of the head stack assembly 30 of FIG. 3.

The head gimbal assembly 42 further includes a metal base plate 72. The metal base plate 72 may be used to swage attach the load beam 66 to an end of the actuator arm 36. The metal base plate 72 may be disposed between the load beam 66 and the actuator arm 36. The flexure 68 is disposed upon the load beam 66.

In the embodiment shown, there is provided the head gimbal assembly 42 for the disk drive 10. The head gimbal assembly 42 includes the read head 40, the metal load beam 66, the flexure 68, and the metal base plate 72. The read head 40 includes the slider 96 and a transducer. The slider 96 includes a top surface 74 and an air bearing surface 76 that opposes the top surface 74, a leading side 80, and a trailing side 78 that includes the transducer and opposes the leading side 80. The slider 96 further includes first, second and third electrically conductive pads 82a-c disposed upon the trailing side 78. The first electrically conductive pad 82a is disposed between the second and third electrically conductive pads 82b-c. The flexure 68 includes a flexure body portion 84, a tongue portion 86 with the slider 96 affixed to the load beam 66, first and second gimbal arms 88, 90 extending between the flexure body portion 84 and the tongue portion 86, a metal backing layer 98, and a dielectric layer 92. The flexure 68 further includes first, second, and third patterned conductive traces 94a-c respectively electrically connected to the first, second, and third electrically conductive pads 82a-c and disposed upon the dielectric layer 92. The first patterned conductive trace 94a is disposed upon the dielectric layer 92 between the top surface 74 of the slider 96 and the dielectric layer 92. The second patterned conductive trace 94b is disposed in the tongue portion 86 and extends along the first gimbal arm 88 to the flexure body portion 84. The third patterned conductive trace 94c is disposed in the tongue portion 86 and extends along the second gimbal arm 90 to the flexure body portion 84. The first patterned conductive trace 94a is disposed between the second and third patterned conductive traces 94b-c along the flexure body portion 84. The base plate 72 is attached to the load beam 66.

According to various embodiments, the flex cable 62 may be electrically connected to the flexure 68 at the flexure body portion 84. The flexure body portion 84 includes the flexure tail 70 and the flex cable 62 may be electrically connected to the flexure tail 70. The flex cable 62 and the flexure tail 70 are electrically and mechanically connected to each other according to any of those methods that are well known to one of ordinary skill in the art. Though not shown, a pre-amp may additionally be provided adjacent the flexure tail 70 at the interface with the flex cable 62. The particular trace routing of the first, second, and third patterned conductive traces 94a-c is contemplated to impact the pin-out ordering at the connection location with the flex cable 62. This would allow use of flex cable designs as well as pre-amp designs that are not restricted by standard trace ordering configurations. It is understood that the first patterned conductive trace 94a (the trace that includes a portion between the top surface 74 of the slider 96 and the dielectric layer 92) may be routed to any other ordered location along the flexure body portion 84 that is between two other traces according to various other embodiments not shown. Thus, an inner electrically conductive pad may be connected to an inner trace routing location in the flexure body portion 84 relative to two other pad/trace combinations.

The tongue portion 80 and the first and second gimbal arms 82, 84 may be generally referred to as a gimbal. The first and second gimbal arms 82, 84 provide angular compliance to the head 40 to allow the head 40 to follow undulations of the surface of the rotating disk 20.

The flexure 68 includes the metal backing layer 98. The metal backing layer 98 is included within the tongue portion 86 and the first and second gimbal arms 88, 90. The dielectric layer 92 may be disposed between the metal backing layer 98 and the conductive traces 94 such as shown. The metal backing layer 98 may be stainless steel, for example. In this regard, the metal backing layer 98 may be used to provide structural support for the conductive traces 94 and the slider 96. The metal backing layer 98 may be affixed to the load beam 66 in the flexure body portion 84. For example, the metal backing layer 98 may be spot-welded to the load beam 66.

It is contemplated that the metal backing layer 98 may be attached to an electrical ground. For example, the metal backing layer 98 may be in electrical communication with other components of the head gimbal assembly 42, such as the load beam 66 or the metal base plate 72. The load beam 66 is joined with the metal base plate 72 which is attached to the actuator arm 36. The actuator arm 36 may be disposed in electrical communication with the disk drive base 16 via the pivot bearing cartridge 44, and thus is considered to be an electrical ground. In addition, the load beam 66 may include a dimple 122 as seen in FIG. 4. The tongue portion 86 may contact the dimple portion 122 for structural support as well as electrical grounding of the metal backing layer 98.

The dielectric layer 92 may be formed of various materials, such as polyimide. The dielectric layer 92 may be formed of discrete portions such as shown. The dielectric layer 92 may serve to electrically insulate the conductive traces 94 from electrically shorting with the metal backing layer 98.

In the embodiment shown, the slider 96 may further include fourth, fifth, and sixth electrically conductive pads 82d-f disposed upon the trailing side 78. The first and third electrically conductive pads 82a,c are innermost ones of the pads 82. The fourth and sixth electrically conductive pads 82d,f are outermost ones of the pads 82.

The flexure 68 may further include corresponding fourth, fifth, and sixth patterned conductive traces 94d-f disposed upon the dielectric layer 92. The fourth patterned conductive trace 94d is disposed in the tongue portion 86 and extends along the first gimbal arm 88 to the flexure body portion 84. The fifth patterned conductive trace 94e is disposed in the tongue portion 86 and extends along the second gimbal arm 90 to the flexure body portion 84. As such, the first patterned conductive trace 94a is disposed along the flexure body portion 84 between the fourth and fifth patterned conductive traces 94d-e. The sixth patterned conductive trace 94f is disposed in the tongue portion 86 and extends along the second gimbal arm 90 to the flexure body 84. The first and sixth patterned conductive traces 94a,f are innermost ones of the traces 94. The second and third patterned conductive traces 94b,c are outermost ones of the conductive traces 94.

As shown in FIGS. 6-7, the patterned conductive traces 94a-f may respectively terminate at connection terminals 100a-f disposed at the tongue portion 86. The electrically conductive pads 82a-f may be electrically connected to the patterned conductive traces 94a-f according to any of those methods that are well known to one of ordinary skill in the art. For example, gold ball bonds 102 may be used to electrically connect the electrically conductive pads 82a-f to the patterned conductive traces 94a-f.

As mentioned above, there are provided the patterned conductive traces 94a-f Various deposition techniques may be utilized to form the conductive traces 94a-f upon the dielectric layer 92. It is understood that the conductive traces 94 would not include discrete insulated wiring for example. The conductive traces 94 may be formed of a metal, such as copper.

As mentioned above, the first patterned conductive trace 94a is disposed upon the dielectric layer 92 between the top surface 74 of the slider 96 and the dielectric layer 92. As seen in the plan view of FIG. 6, the first patterned conductive trace 94a may include a trace segment 104. For ease of illustration of the trace segment 104, the slider 96 is not shown in FIG. 6. However, a slider periphery 106 is shown to indicate the installed location of the slider 96. The first patterned conductive trace 94a is positioned to be an innermost one of the conductive traces 94 along the flexure body portion 84 because the trace segment 104 is routed "underneath" the slider 96 from the connection terminal 100a. This is in contrast to the other ones of the conductive traces 94b-f that extend from the connection terminals 110b-f in a conventional manner which is initially away from the trailing side 78 of the slider 96.

As seen in the plan view of FIG. 6, the first patterned conductive trace 94a may include a support portion 108. The support portion 108 is disposed between the top surface 74 of the slider 96 and the dielectric layer 92 within the slider periphery 106. As such, the support portion 108 supports the slider 96. The support portion 108 may be generally rectangular shaped such as shown or may be of other geometries. An adhesive compound, such as a structural epoxy, may be used for secure attachment of the slider 96 to the tongue portion 86. Though not shown, such adhesive compound may be distributed across the dielectric layer 92 within the geometry defined by the support portion 108. The support portion 108 may further include an additional support segment 114 to facilitate further structural support of the slider 96 and a balanced distribution of adhesive compound.

The tongue portion 86 may include exposed features 110, 112 through the dielectric layer 92. Such exposed features 110, 112 may accommodate additional adhesive compounds for secure attachment of the slider 96. Moreover, a conductive epoxy may be used to electrically ground the top surface 74 to the tongue portion 86.

The first patterned conductive trace 94a may be connected to an electrical ground. In the embodiment shown, the first patterned conductive trace 94a is electrically connected to the metal backing layer 98 through the dielectric layer 92. As shown in FIGS. 4 and 6, the dielectric layer 92 may include a via 120. FIG. 7 is a cross-sectional side view of a portion of the flexure 68 as seen along axis 8-8 of FIG. 6. A through hole 116 may be formed through the dielectric layer 92 and the metal backing layer 98. The first patterned conductive trace 94a may include a connecting segment 118 that extends between the connection terminal 100a and the through hole 116. The via 120 may be formed of the same material of the conductive trace 94a. The first patterned conductive trace 94a may be electrically connected to the metal backing layer 98 through the via 120. As such, the via 120 may be used to provide an electrical ground to the electrically conductive pad 82a through the ball bond 102a and the connecting segment 118. By routing the conductive trace 94a between the top surface 74 through the trace segment 104 a common ground may be established from the conductive pad 82a to the first patterned conductive trace 94a at an innermost pin-out location of the flexure tail portion 70 at the interface with the flex cable 62.

What is claimed is:

1. A head gimbal assembly (HGA) for a disk drive, the HGA comprising:
    a slider including a top surface and an air bearing surface that opposes the top surface, a leading side, and a trailing side that opposes the leading side, the slider further including first, second and third electrically conductive pads disposed upon the trailing side, the first electrically conductive pad being disposed between the second and third electrically conductive pads;
    a load beam;
    a flexure including:
        a flexure body portion affixed to the load beam;
        a tongue portion with the slider being attached to the tongue portion;
        first and second gimbal arms extending between the flexure body portion and the tongue portion;
        a metal backing layer;
        a dielectric layer;
        first, second, and third conductive traces respectively electrically connected to the first, second, and third electrically conductive pads so that the first conductive trace is electrically connected to the first electrically conductive pad, each conductive trace being disposed upon the dielectric layer with the dielectric layer between each conductive trace and the metal backing layer, the first conductive trace being disposed upon the dielectric layer between the top surface of the slider and the dielectric layer, the second conductive trace being disposed in the tongue portion and extending along the first gimbal arm to the flexure body portion, the third conductive trace being disposed at the tongue portion extending along the second gimbal arm to the flexure body portion, the first conductive trace disposed between the second and third conductive traces in the flexure body portion; and
    a base plate for mounting the HGA, the base plate attached to the load beam.

2. The HGA of claim 1 wherein the dielectric layer comprises polyimide.

3. The HGA of claim 1 wherein the metal backing layer comprises stainless steel.

4. The HGA of claim 1 wherein the first conductive trace is electrically connected to the metal backing layer through the dielectric layer.

5. The HGA of claim 4 wherein the dielectric layer includes a via and the first conductive trace is electrically connected to the metal backing layer through the via.

6. The HGA of claim 1 wherein the first conductive trace is connected to an electrical ground.

7. The HGA of claim 1 further comprising a flex cable electrically connected to the flexure at the flexure body portion.

8. The HGA of claim 7 wherein the flexure body portion includes a flexure tail portion and the flex cable is electrically connected to the flexure tail portion.

9. The HGA of claim 1 wherein the first conductive trace includes a support portion, the support portion being disposed between the top surface of the slider and the dielectric layer, the support portion being generally rectangular shaped.

10. The HGA of claim 1 wherein the slider further includes fourth and fifth electrically conductive pads disposed upon the trailing side and the flexure further includes fourth and fifth conductive traces disposed upon the dielectric layer, the fourth conductive trace being disposed in the tongue portion and extending along the first gimbal arm to the flexure body portion, the fifth conductive trace being disposed at the gimbal extending and along the second gimbal arm to the flexure body portion.

11. The HGA of claim 10 wherein the first conductive trace is disposed along the flexure body portion between the fourth and fifth conductive traces.

12. The HGA of claim 1 wherein the metal backing layer is affixed to the load beam in the flexure body portion.

13. The HGA of claim 12 wherein the metal backing layer is spot-welded to the load beam in the flexure body portion.

14. The HGA of claim 1 wherein the load beam includes a dimple that contacts the tongue portion.

* * * * *